(12) United States Patent
Chang

(10) Patent No.: US 6,907,579 B2
(45) Date of Patent: Jun. 14, 2005

(54) USER INTERFACE AND METHOD FOR INTERACTING WITH A THREE-DIMENSIONAL GRAPHICAL ENVIRONMENT

(75) Inventor: Nelson Liang An Chang, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 495 days.

(21) Appl. No.: 10/021,648

(22) Filed: Oct. 30, 2001

(65) Prior Publication Data

US 2003/0081012 A1 May 1, 2003

(51) Int. Cl.$^7$ ............................. G06F 3/00; G06T 17/00
(52) U.S. Cl. ...................... 715/850; 715/852; 345/418
(58) Field of Search ................................ 715/781, 782, 715/848–852; 345/418

(56) References Cited

U.S. PATENT DOCUMENTS

| | | | | |
|---|---|---|---|---|
| 5,734,805 A | * | 3/1998 | Isensee et al. ............... | 345/419 |
| 5,883,628 A | * | 3/1999 | Mullaly et al. ............. | 715/850 |
| 5,907,328 A | * | 5/1999 | Brush II et al. ............ | 715/863 |
| 6,031,536 A | * | 2/2000 | Kamiwada et al. ......... | 715/729 |
| 6,057,856 A | * | 5/2000 | Miyashita et al. .......... | 345/633 |
| 6,097,393 A | * | 8/2000 | Prouty et al. ............... | 345/419 |
| 6,154,211 A | * | 11/2000 | Kamachi et al. ............ | 345/419 |
| 6,219,045 B1 | * | 4/2001 | Leahy et al. ................ | 345/757 |
| 6,271,843 B1 | * | 8/2001 | Lection et al. .............. | 715/848 |
| 6,346,938 B1 | * | 2/2002 | Chan et al. .................. | 345/419 |
| 6,346,956 B2 | * | 2/2002 | Matsuda ...................... | 345/848 |
| 6,414,679 B1 | * | 7/2002 | Miodonski et al. .......... | 345/420 |
| 6,417,856 B1 | * | 7/2002 | Tamura et al. .............. | 345/474 |
| 6,580,441 B2 | * | 6/2003 | Schileru-Key .............. | 715/805 |
| 6,636,210 B1 | * | 10/2003 | Cheng ......................... | 345/419 |

FOREIGN PATENT DOCUMENTS

| | | |
|---|---|---|
| WO | WO0020987 | 4/2000 |
| WO | WO0169364 | 9/2001 |

OTHER PUBLICATIONS

Raymond R. Panko and David K. Panko "Where do you want to fly today? A user interface travel Genre Based on Flight Simulators" 1060–3425/98 1998 IEEE Proc. 31st Annual Hawaii International Conference on System Science pp. 110–118.

* cited by examiner

*Primary Examiner*—John Cabeca
*Assistant Examiner*—Brian Detwiler

(57) ABSTRACT

A user interface and method for interacting with a three-dimensional graphical environment is determined. Multiple viewing perspectives are provided to the user to allow the user to view and navigate through the environment at approximately eye level or "fly over" and view the environment from an overhead view. Labels corresponding to partitioned areas rotate to adjust to the changing perspective of the user and area color coding adjusts hierarchically dependent on the user's perspective. Partitions and the ceiling of the environment have variable translucency/transparency so as to provide the user with forward viewing capability of the environment and read labels in other areas. The interface controls the movement of the user's in a natural manner and movement is tracked to provide the user with a history of the user's previous navigation path. Addition information views are provided by the interface relating to different objects within the interface.

5 Claims, 8 Drawing Sheets

"INSIDE" MODE VIEWING PERSPECTIVE

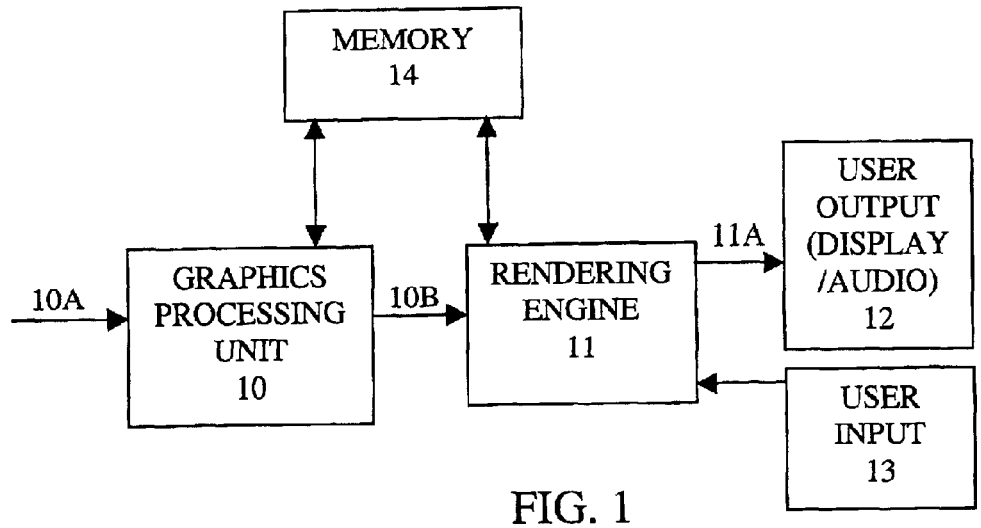
FIG. 1
PRIOR ART
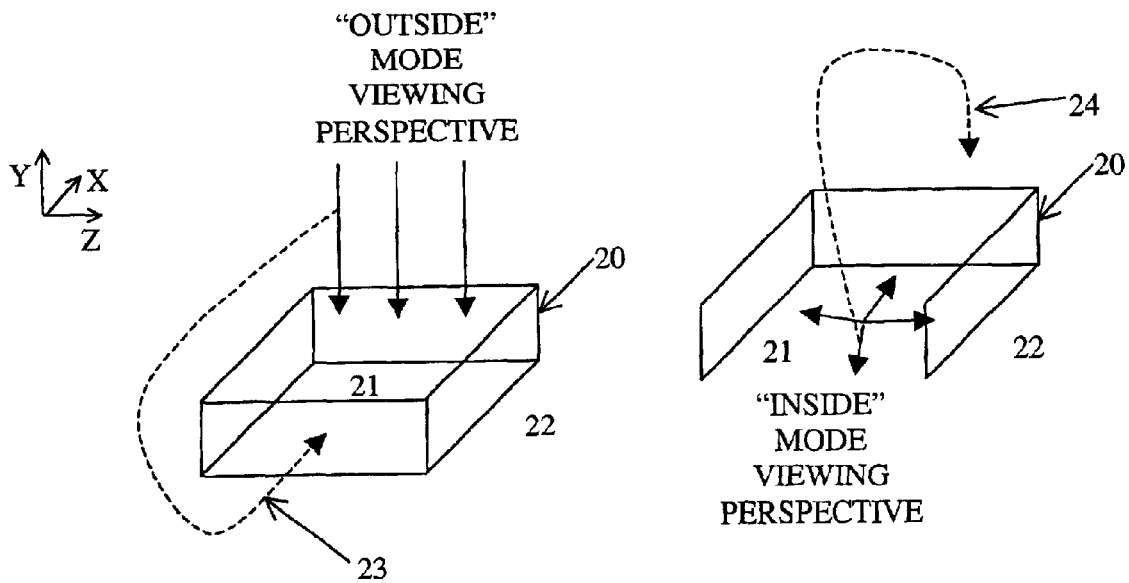
Fig. 2
Fig. 3

USER INTERFACE AND METHOD FOR INTERACTING WITH A THREE-DIMENSIONAL GRAPHICAL ENVIRONMENT

FIELD OF THE INVENTION

The present invention relates to three-dimensional graphical environments and in particular, this disclosure provides a user interface to improve discovery of and navigation through a three-dimensional graphical environment.

BACKGROUND OF THE INVENTION

Interfaces are used to provide a user with a means of visualizing information on a display screen. There are some universally desirable features of the interface regardless of the application. It should enable the user to navigate and browse through the information quickly. It should be visually compelling and interactive to allow the user to effortlessly manipulate the visualization. Finally, it should be an intuitive interface.

The type of user interface is generally determined by the manner in which the interface represents the information displayed on the system screen. For instance, one simple well-known interface represents a plurality of data objects (i.e., word processing documents, images, video clips) as icons and textual labels. In this case, the interface is designed so as to allow easy manipulation and intuitive viewing of the icons. For instance, this type of interface allows a user to cut/paste/copy an icon from one place to another in the display or allows a user to change the manner in which the icons and labels are viewed (i.e., as a listing of files or groups of icons). This type of interface often has a "find" option that will search for and find specific files. Other well-known word processing interfaces display a text document or image document and allow a user to edit and compose a document or image. This type of user interface often includes a menu that provides the user with different options for editing, viewing, and formatting the document being displayed.

Three-dimensional graphical interfaces display information within a three-dimensional graphical (or virtual) environment to allow viewing of and navigation through information in an intuitive and immersive manner. Since people are physically accustomed to navigating through and viewing objects in a real three-dimensional world, a three-dimensional graphical environment becomes an intuitive, immersive, and natural environment to the user. Often, the information that is represented by the three-dimensional interface is a large database of data objects. The interface displays the data objects as representative images within the three-dimensional graphical environment and then provides the user the ability to navigate within the virtual environment to view the representative images and interact with the corresponding data objects. As can be imagined, if the environment is not displayed in an organized or logical manner or if the user's ability to navigate through the environment is limited or awkward, the advantages of using a three-dimensional interface are significantly diminished. In fact, an ineffectual three-dimensional interface could more easily frustrate than assist a user.

The present invention is a three-dimensional graphical interface providing advantageous user movement and control within the three-dimensional graphical environment as well as manners in which to display the environment.

SUMMARY OF THE INVENTION

A user interface and method of using thereof for a three-dimensional graphical environment including at least the following aspects is described:

- multiple viewing perspectives providing the user with extremely flexible movement and viewing of the environment;
- intelligent and intuitive labeling and color coding of the environment;
- variable translucency/transparency to the environment to enhance the user's forward viewing ability;
- movement control to give the user the perception of a "natural" movement;
- tracking of movement;
- additional information windows;
- image object selection;
- constraint of user motion; and
- automatic navigation paths.

Other aspects and advantages of the invention will become apparent from the following detailed description, taken in conjunction with the accompanying drawings, illustrating by way of example the principles of the invention.

BRIEF DESCRIPTION OF THE DRAWINGS

FIG. 1 shows a prior art system for generating a three-dimensional graphical environment;

FIGS. 2 and 3 illustrate a first and a second viewing mode in accordance with the three-dimensional graphical interface of the present invention;

DETAILED DESCRIPTION

Figure 4A:
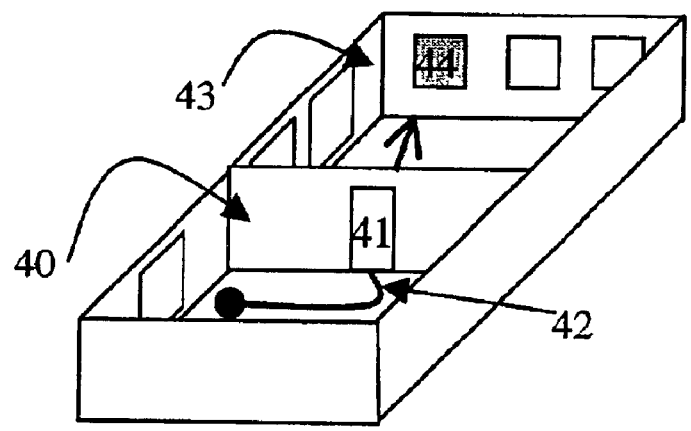
FIGS. 4A and 4B illustrate navigating advantages by providing translucent partitions in accordance with the three-dimensional graphical interface and method of using thereof.

In general, the present invention is a user interface and method of using thereof for viewing a plurality of representative images in a three-dimensional graphical environment. According to this description, each representative image corresponds to a data object. A data object is broadly defined as stored data that corresponds to a tangible or intangible object or element. Examples of types of data objects can include but are not limited to image data, audio data, word processing data, video data, and 3-D models. Examples of types of objects or elements can include but are not limited to movie videos, CDs, works of art, electronic word processing documents, electronic personnel records, and commercial inventory. If, for instance, the object type is movie videos, a specific object of that type would be a particular movie. Moreover, representative images can be embodied as text labels, natural images, graphical images, document and file folder images, video images, three-dimensional models, or any type of visual data. In one embodiment, the data objects stored within a database are related such that they can be logically viewed, categorized, grouped and/or arranged in some way with respect to their associated data object.

Each data object can have associated data referred to as metadata which corresponds to any data other than the data object itself that describes or relates to the data object, and each data object may have different types of metadata. For instance, in the case in which the object type is movie videos, types of metadata may include data corresponding to the title of the movie, director of the movie, the release date of the movie, the actors of the movie, genre of movie (e.g., comedy, drama) etc. In contrast, in the case in which the object type is artwork, types of metadata may include title of the work and school of art (e.g. modern, impressionistic). Metadata can be stored with the data object or may be stored separately such that a link exists between the data object and its associated metadata.

The user interface of the present invention can be implemented in a system adapted to render and display a three-dimensional image. FIG. 1 shows an example of such a system including a graphics processing unit 10, a rendering engine 11, a user output 12, a user input 13, and memory 14. The graphics processing unit 10 functions to receive data object data 10A and generate three-dimensional imaging data 10B corresponding to a three-dimensional graphical environment including representative images of the data objects within the three-dimensional environment as is well known in the field of graphics imaging. Rendering engine 11 receives imaging data 10B and generates rendering data 11A for driving user output 12. For instance, rendering data 11A drives a monitor (not shown) to display the three-dimensional graphical environment including the representative images. User input 13 allows a user to interact with the three-dimensional environment via a user interface. For instance, the user input 13 allows the user to control the user interface to navigate through and view the three-dimensional environment by moving a displayed cursor using a keyboard or mouse. Other types of user input 13 include but are not limited to a joystick and a pressure sensitive screen. Graphics processing unit 10 may function to generate the representative images of the data objects or the representative image data may be stored within the memory 14 and linked to a data object database.

Viewing and Navigation

According to one embodiment of the user interface and method of using thereof, two modes are provided, each one giving the user a viewing perspective originating from either inside or outside of an environment. According to this embodiment, if the user is viewing outside of the environment or is viewing the inside of the environment (through the ceiling) from an outside viewing perspective, this constitutes the "outside" mode. Similarly, if the user is viewing within the inside of the environment or is viewing the outside of the environment (through the ceiling) from an inside viewing perspective, this constitutes the "inside" mode. In either mode, the user is allowed to view and navigate the environment with six degrees of freedom (i.e., translations in x, y, z and rotations about x, y, z).

FIG. 2 illustrates the "outside" mode in which the viewing perspective originates from outside of environment 20. As shown, environment 20 is bounded so as to form two areas, an inside area 21 and an outside area 22. As shown in this example, the viewing perspective originates above the environment within outside area 22 and provides an overhead view of the environment. This perspective facilitates viewing the entire environment at once so as to identify logical groupings of the representative images. For instance, in the case in which the environment is partitioned into a plurality of areas and logically grouped representative images are displayed within each area, the outside viewing mode allows the viewer to easily identify the logical groupings within the environment. In addition, the "outside" mode provides the user the ability to easily and quickly navigate from one area of the environment to another, since navigation occurs above the environment and there are no obstacles to navigate around.

FIG. 3 illustrates the "inside" viewing mode in which the viewing perspective originates from inside area 21. As shown in this example, this viewing perspective allows direct viewing of, interaction with, and navigation to all representative images within the environment. The "inside" mode allows the user to be completely immersed in the three-dimensional graphical environment, to view the representative images in greater detail, and to interact with the corresponding data objects.

It should be noted that viewer mode (i.e., "inside" and "outside" modes) can be user selected or can be automatically selected dependent on user movements. It should be further noted that the boundary between the inside area 21 and outside area 22 is not necessarily explicitly represented. For instance, a boundary may be implicit in that it is the point at which the inside area 21 of the three-dimensional graphical environment stops and/or the outside area 22 begins.

In another embodiment, when switching between modes, the user is provided with a continuous viewing perspective transition, thereby giving the user the perception of flying between modes. For instance, as shown in FIG. 2, the user begins in the "outside" mode and automatically transitions to the "inside" mode along path 23. Similarly, the user can begin in the "inside" mode and automatically transition to the "outside" mode along path 24 (FIG. 3). The views for the user are computed by a linear interpolation of the six motion parameters over a particular time interval. Specifically, suppose $(x_0, y_0, z_0, \phi_0, \theta_0, \rho_0)$ are the translation and rotation parameters for the starting viewing perspective and $(x_f, y_f, z_f, \phi_f, \theta_f, \rho_f)$ are the corresponding target parameters. Then, new motion parameters $(x_i, y_i, z_i, \phi_i, \theta_i, \rho_i)$ are determined according to the following mathematical statement (Eq. 1):

$$(x_i, y_i, z_i, \phi_i, \theta_i, \rho_i) = \begin{pmatrix} x_0 + \frac{i*(x_f - x_0)}{T}, y_0 + \frac{i*(y_f - y_0)}{T}, z_0 + \frac{i*(z_f - z_0)}{T}, \\ \phi_0 + \frac{i*(\phi_f - \phi_0)}{T}, \theta_0 + \frac{i*(\theta_f - \theta_0)}{T}, \rho_0 + \frac{i*(\rho_f - \rho_0)}{T} \end{pmatrix} \quad \text{Eq. 1}$$

where i ranges from 0 to T for some time interval T. Note that this interpolation gives a smooth transition between any starting and ending viewing perspective.

In still another embodiment, in which the environment is partitioned into a plurality of areas, the user is provided with the ability to navigate within the environment by passing over partitions. Specifically, the user can automatically transition from the "inside" mode on one side of a partition to the "outside" mode above the partition and then back to the "inside" mode somewhere else within the environment with a continuous viewing perspective transition. This transition gives the user the perception of flying over partitions.

Figure 4B:
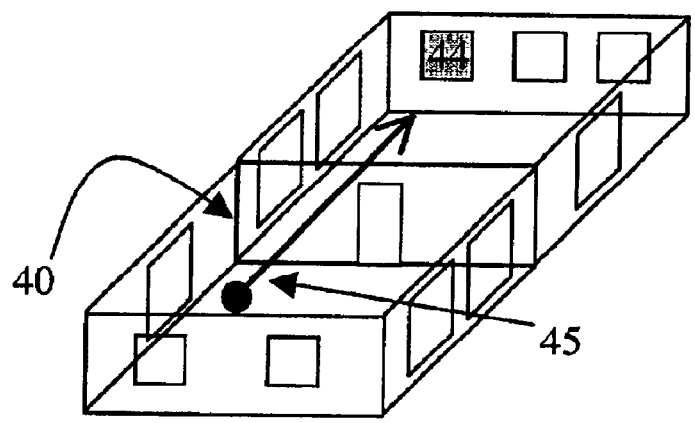

In still another embodiment, instead of passing over partitions, the user is provided with the ability to pass through partitions, thereby reducing the navigation path into other partitioned areas within the environment. According to this embodiment, partitions can be made transparent or translucent such as shown in FIGS. 4A and 4B. The user, having the ability to see images in other areas, is then provided with a motivation to navigate through partitions since navigation through the partitions can result in a shorter path to the desired image within the next area. For instance, in FIG. 4A, only the images within area 40 are visible when the user is positioned within area 40. As the user navigates through the door 41 along path 42 into the next area 43 the viewer notices image 44 and then navigates towards it. However, as shown in FIG. 4B, when the partitions become transparent or translucent, the viewer can see image 44 while in area 40 and can navigate directly along path 45 to image 44 through the partition without going through the door, thereby shortening the navigation path.

Area Identification

According to another embodiment of the user interface and method of using thereof, areas are distinguished according to at least one predetermined image grouping. For instance, in a partitioned environment including a plurality of areas bounded by partitions and ceilings, the partitions and/or ceilings are made visibly distinguishable using, for instance, colors, patterns etc., so as to distinctly identify each area within the environment dependent on the predetermined image grouping. In one embodiment, partitioned areas (i.e., partitions, ceilings, labels, etc.) are colored according to the predetermined grouping. According to this embodiment, images within a given area can be grouped according to the images' corresponding data object metadata.

Figure 5A:
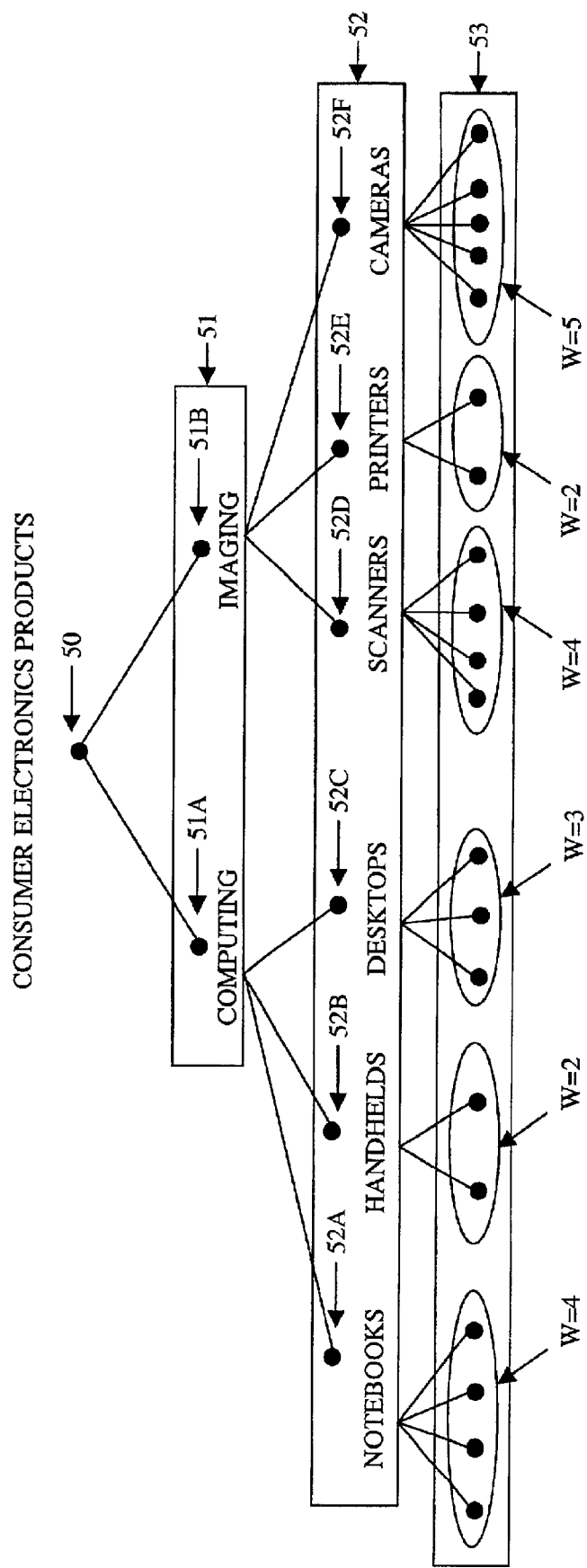
FIG. 5A illustrates a database of objects represented by a hierarchical tree.

Furthermore, representative images of a database of objects can be hierarchically grouped dependent on data object metadata by representing the database according to a hierarchical tree. FIG. 5A shows an example of a database represented by a hierarchical tree. The tree includes a plurality of nodes 50, 51A, 51B, 52A–52C, 52D–52F, and 53. Nodes 53 are data object nodes each corresponding to one of the data objects within the database. Each of the nodes 50–52 corresponds to different metadata types used for classifying and grouping the data object nodes 53. For instance, nodes 51 correspond to product function type that includes computing type products and imaging type products. Under the computing type product node are a first set of device type nodes including notebooks, handhelds, and desktops. Under the imaging type product node are a second set of device type nodes including scanners, printers, and cameras. Under each of the device type nodes are the actual products each corresponding to a data object within the database.

Figure 5B:
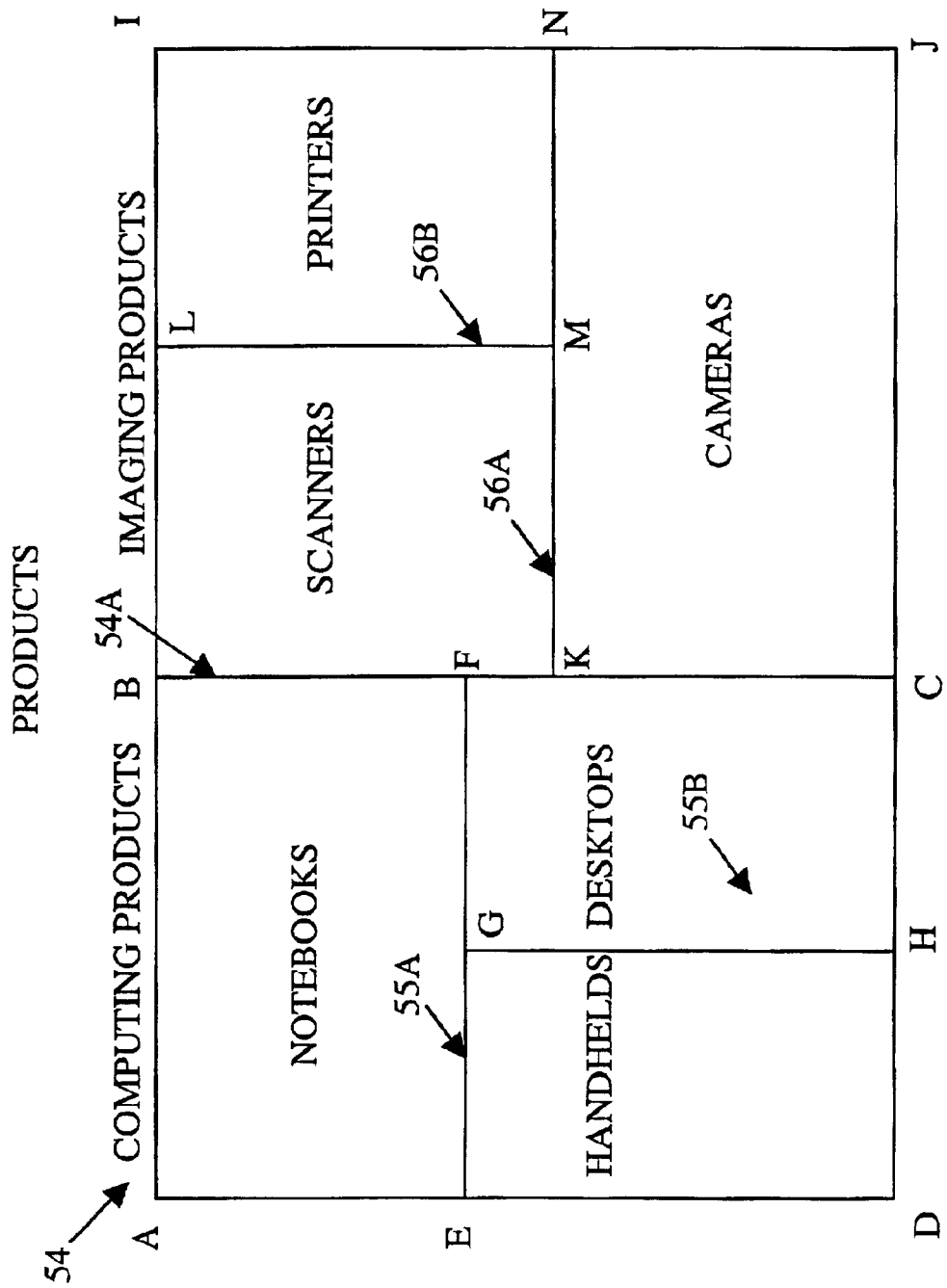
FIG. 5B illustrates an overhead view of a three-dimensional area partitioned according to the hierarchical tree shown in FIG. 5A.

FIG. 5B shows an example of an overhead view of a three-dimensional area corresponding to the layout of a three-dimensional graphical environment partitioned according to a hierarchical tree shown in FIG. 5A. The top level of the tree including node 50 corresponds to the group of all of the data objects. Consequently, this hierarchical level corresponds to the undivided three-dimensional environment. In this example, the undivided three-dimensional environment corresponds to the two-dimensional area 54 bounded by vertices AIJD (FIG. 5B). The next level including nodes 51 correspond to two groups of data objects including the computing products and the imaging products. This level corresponds to the two areas bounded by vertices ABCD and BIJC, respectively. The next level including nodes 52 correspond to the six groups of data objects including notebooks, handhelds desktops, scanners, printers, and cameras. Each of these groups corresponds to six areas bounded by the following vertices: ABFE, EGHD, GFCH, BLMK, LINM, and KNJC, respectively.

According to one embodiment of the user interface and method of using thereof, the partitioned areas corresponding to images grouped according to a hierarchical tree based on metadata are made visibly distinguishable from other areas in the environment using, for instance, colors, patterns etc., so as to distinctly identify each area within the environment. According to one embodiment, each partitioned area is made visibly distinguishable by causing any or all of the partitions, ceilings, labels, or any element associated with the area to be displayed in a unique color. It should be noted that this identification method can be automatically performed by the user interface or may be selected by the user. In addition, once the identification method is selected, selection of how areas are made to be distinguishable (i.e., which colors or patterns are used, whether patterns or colors are used, the darkness or lightness of the colors/patterns, etc.) may be automated or user selected. For instance, the user may explicitly select particular colors, patterns, etc.

Figure 6B:
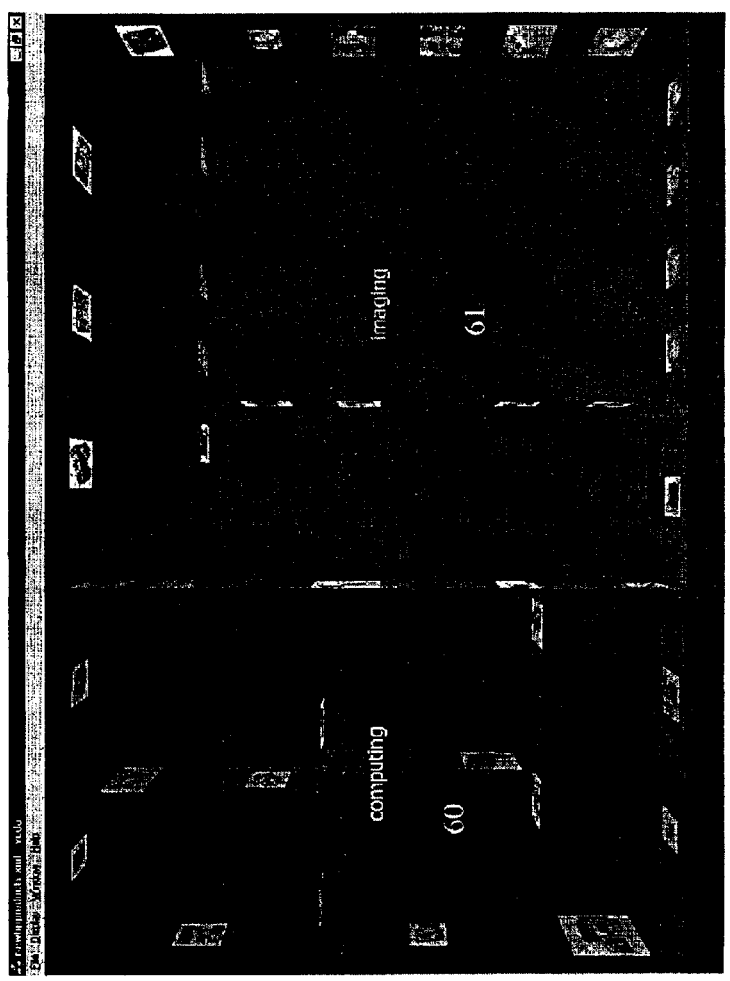
FIG. 6B shows an example of the actual appearance of the interface corresponding to the representation of the three-dimensional area shown in FIG. 6A.
Figure 6A:
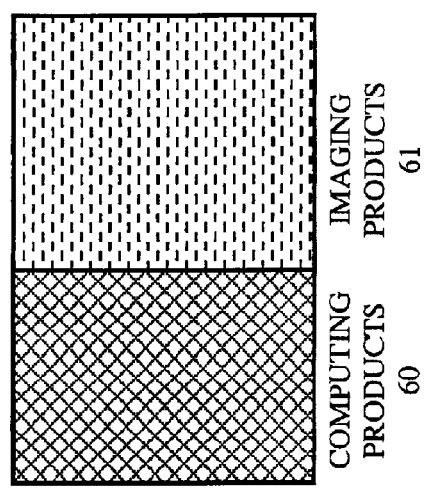
FIG. 6A illustrates the three-dimensional area shown in FIG. 5B having partitioned areas visibly distinguished according to a first hierarchical grouping of images.
Figure 6D:
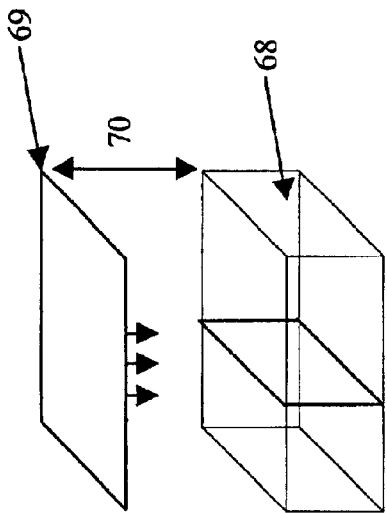
FIG. 6D illustrates a viewing plane above a three-dimensional graphical environment.
Figure 6E:
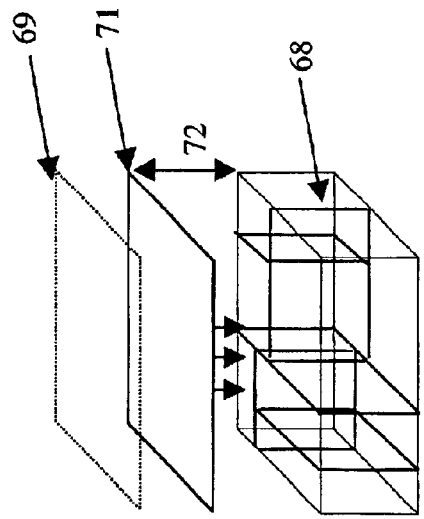
FIG. 6E illustrates distinguishing partitioned areas according to hierarchical grouping levels dependent on the viewing plane distance to the environment.
Figure 6C:
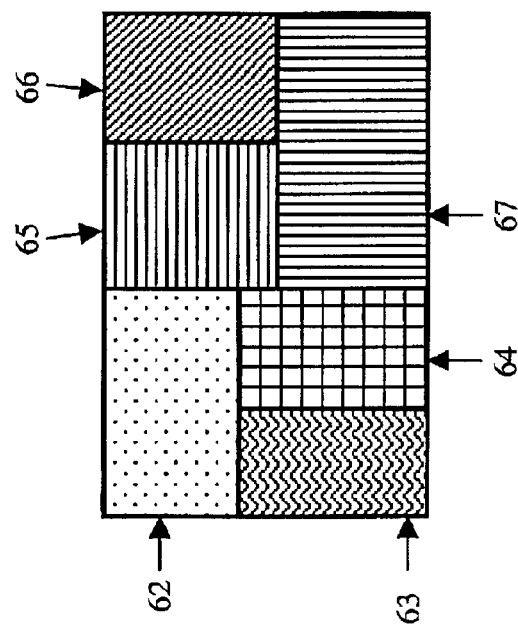
FIG. 6C illustrates the three-dimensional area shown in FIG. 5B having partitioned areas visibly distinguished according to a second hierarchical grouping of images.

According to another embodiment of the user interface and method thereof, partitioned area colors are variable dependent the hierarchical grouping of the images. As shown by the hierarchical tree representing the database of objects (FIG. 5A), objects are grouped differently at each level of the tree. On the highest level (node 50), all objects are grouped together as consumer electronics products. On the second level (nodes 51), objects are divided between two groups, computing and imaging. Consequently, partitioned areas are colored, patterned, etc., according to the hierarchical level by which the images are currently grouped. FIG. 6A shows an overhead view of how areas are made distinguishable according to a first hierarchical grouping level including nodes 51. In particular, the area 60 corresponding to the computing products (FIG. 5B) is identified by a first pattern and the area 61 corresponding to the imaging products is identified by a second pattern. FIG. 6B shows the actual appearance of the interface shown in FIG. 6A. FIG. 6C shows an overhead view distinguishing areas according to a second hierarchical grouping level including nodes 52. As shown, each of the areas corresponding to notebooks 62, handhelds 63, desktops 64, scanners 65, printers 66, and cameras 67 are differentiated and identified by a different pattern. It should be noted that although FIGS. 6A–6C show area ceilings being distinguished and identifiable by different patterns, other aspects of each area may also be similarly distinguished by the same color or pattern. For instance, a label identifying the grouping of an area may have the same color as the grouped area.

Distinguishing areas of the environment with respect to different hierarchical grouping levels can be manually selected or initiated by changing viewing perspective. For instance, a user can manually select a particular hierarchical grouping level from the user interface menu to distinguish groups in the environment to cause the partitioned areas to be distinguished according to that grouping level. Alternatively, hierarchical grouping level, and consequently partitioned area color, patterns, etc., can change as the viewing perspective of the user changes. For instance, FIG. 6D shows a three-dimensional graphical environment 68 having an "inside" area and an "outside" area. Plane 69 above the environment represents a viewing plane having a distance 70 from the environment 68. The user's viewing perspective can be located anywhere within a viewing plane, directed towards the environment 68. The partitioned areas in environment 68 are distinguished according to the first hierarchical grouping level dependent on the distance 70 that viewing plane 69 is to environment 68. FIG. 6E shows the three-dimensional environment 68 having a second closer viewing perspective plane 71 that is at a distance of 72 from the environment. As shown, viewing plane 71 is closer than viewing plane 69, and hence, according to this embodiment, partitioned areas in environment 68 are distinguished according to a different hierarchical grouping level. Specifically, partitioned areas within environment 68 are visibly distinguished according to the second hierarchical grouping level similar to that shown in FIG. 6C. In one embodiment, as the viewing perspective ascends/descends above the environment, this movement corresponds to a similar ascension/descension within the hierarchical grouping tree.

It should be noted that the distinguishable ceilings may be selectably or automatically set to be transparent, translucent, or opaque. Non-opaque ceilings allow the user to quickly identify a visually distinguished area of interest while in the "outside" mode and then view (while still in the "outside" mode) the representative images within the area to quickly locate an image of interest or browse through all images within the area of interest. Furthermore, translucent, rather than transparent, ceilings are advantageous since the user can see into the environment and still obtain a sense of the color for the overall grouping. Transparent or translucent ceilings allow a user to observe color/pattern groupings from the "inside" mode as well.

Labels

In another embodiment of the user interface and method of using thereof, labels that identify areas rotate and translate dependent on the user's viewing perspective. In one embodiment, labels located within and corresponding to a partitioned area rotate and translate dependent on the user's viewing perspective whether the user is in the "inside" or "outside" mode. Similarly, labels located outside of the environment corresponding to the area rotate and translate dependent on the user's viewing perspective whether the user is in the "inside" or "outside" mode. According to this embodiment, a non-transparent ceiling can be selected such that only the labels located within the area are visible and rotate dependent on the viewer perspective.

Alternatively, transparent or translucent ceilings can be selected such that the user sees both the label within the area and sees other labels above the area, and such that all labels are movable with respect to the viewer perspective. In this case, labels above the area can correspond to higher-level hierarchical grouping labels as described above. Hence, in this case, the user can be in the "inside" mode navigating within the environment and can select a transparent ceiling to see the hierarchical group label for the area that that is being viewed.

Figure 7A:
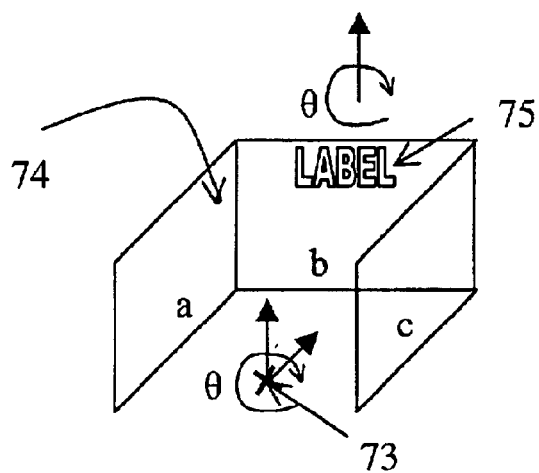
FIGS. 7A–7C illustrate rotatable labels in accordance with the three-dimensional graphical interface and method of viewing a three-dimensional graphical environment of the present invention.
Figure 7B:
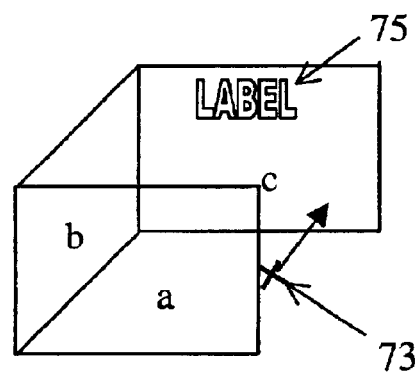

FIGS. 7A and 7B illustrate the manner in which labels are rotatable and translatable dependent on the viewing perspective. A user having a viewing perspective point 73 is initially viewing partition b of area 74 (identified by the visible label 75) and then rotates by an angle of θ about the y-axis to view partition c. The label 75, in turn, rotates by the same angle θ and translates so as to be visible to the user while viewing partition c as shown in FIG. 7B. In one embodiment, label movement is determined by letting $(x_0, y_0, z_0, \phi_0, \theta_0, \rho_0)$ be the user's current viewing perspective and $(x_a, y_a, z_a)$ be the label's position. The label is then rotated by an angle $\theta_a$ about the y-axis given by Eq. 2:

$$\theta_a = \tan^{-1}\left(\frac{z_0 - z_a}{x_0 - x_a}\right)$$ Eq. 2

It should be noted that in this example, the label's translational position remains the same and only the panning angle (i.e., rotation about the y-axis) changes. However, this technique can be performed such that the labels can be tilted (i.e., rotated about the x-axis) toward the user. In addition, the label's position can also be adjusted to maximize user visibility.

Figure 7C:
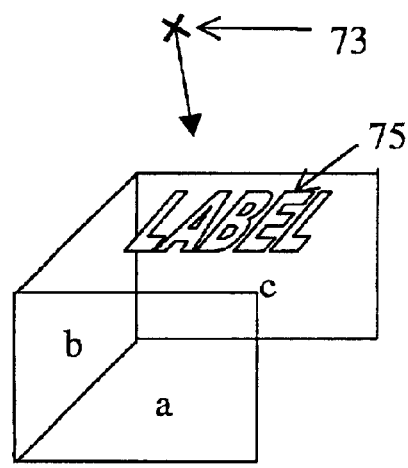

When the viewing perspective 73 is above the environment oriented downward as shown in FIG. 7C, it can be difficult to view the text labels on the partitions within each area as shown in FIGS. 7A and 7B. Hence, according to another embodiment, labels can automatically rotate to point upward at the user. Labels can also rotate within the plane parallel to the viewing perspective plane according to $\theta_a$ maximize the user's visibility of the labels. In still another embodiment, in order to facilitate faster image rendering, all the labels can be rotated by the same angle related to the user's panning angle θ.

Object Selection and Interaction

In another embodiment of the user interface and method of using thereof, images can be selected by lining up the point of sight of the user's viewing perspective with an image of interest and then selection and/or activation can be initiated by the user with an input device such as a keyboard, mouse, or joystick. According to this embodiment, once the point of sight is lined up with the image, upon initiation, the user can be automatically moved closer to the image in the three-dimensional graphical environment. As a result, the user does not have to navigate the remaining distance to the image once the user initiates this "auto-move" mode to the image. This apparent movement is achieved by a linear view interpolation according to Eq. 1, where in this case $(x_0, y_0, z_0, \phi_0, \theta_0, \rho_0)$ is the user's starting translation and rotation parameters, $(x_f, y_f, z_f, \phi_f, \theta_f, \rho_f)$ is the corresponding target parameters, and where the target viewing perspective is positioned in front of the image of interest and oriented fronto-parallel to it. In one embodiment, the interface automatically determines which image the point of sight is lined up with (i.e., the image of interest) dependent on the user's viewing direction and position within the area with respect to each of the area's partitions and images displayed on the partitions. Once the image of interest is identified, the interface can automatically move the user closer to the image. It should be noted that the above described "auto-move" mode can also be applied to automatically move the user to any element in the environment that the line of sight is aligned with. For instance, the user can be automatically moved to an opening in one of the partitions (e.g., doorway) or to a given partition.

The representative images can also become interactive when selected by the user according to the above described automatic selection technique. For instance, a representative image embodied as a three-dimensional model may be rotated by the user to provide the user with additional views of the model. In addition, representative images may be selected to access additional related multi-media data. For instance, a two-dimensional representative image may be selected so as to access an audio clip associated with the data object, access a three-dimensional model of the corresponding two-dimensional image, access a video sequence, access another external application (e.g. a web page), etc.

Viewing and Movement Control

In general, user movement is assigned to input device controls such that the most commonly used movements are assigned to the easiest and most intuitive control sequences for the given input device. It should be further noted that in one embodiment, the number of degrees of freedom provided to the user by the input device is limited or reduced in order to make navigating the environment more manageable. In other words, providing the user with too much navigation freedom can become more confusing and less intuitive to the user. Accordingly, in the case of a joystick with two analog controllers, the two controllers can be assigned as follows: the left controller manipulates forward-backward motion (translation in z) and panning (rotation about y) while the right controller manipulates side-to-side motion and height change (translation in x and y, respectively). The mouse can be assigned in a similar manner, where the left-button-click-and-drag controls forward-backward motion (translation in z) and panning (rotation about y) and the right-button-click-and-drag controls side-to-side motion and height change (translations in x and y). The user can also tilt the viewing perspective (rotate about the x-axis) with a simultaneous left-and-right-click-and-drag. The keyboard can be assigned in a similar manner with the cursor keys and simultaneous pressing of the shift key. It should be noted that the above translations and rotations are locally defined with respect to the user's current viewing perspective.

Figure 8:
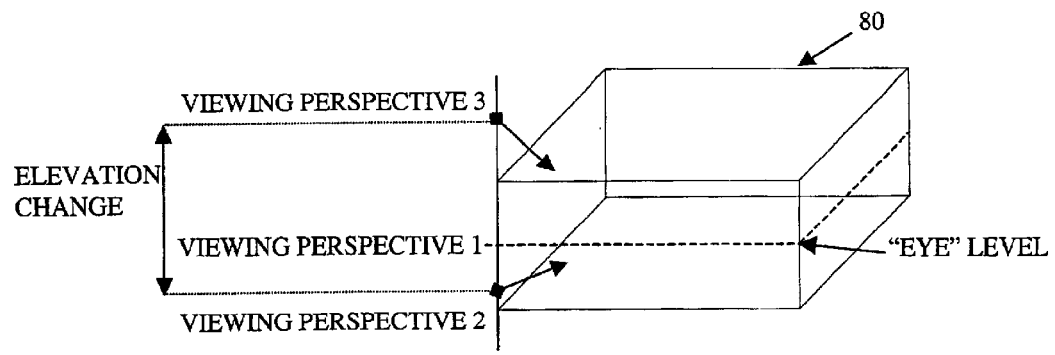
FIG. 8 shows adjustment of viewing angle dependent on viewing perspective elevation.

In one embodiment, the tilt angle of the viewing perspective is controlled dependent on the elevation of the viewing perspective with respect to the x-z plane. For instance, referring to FIG. 8, an eye-level elevation with respect to an environment 80 is predetermined and the current viewing perspective is compared to it. If the viewing perspective is at the eye-level elevation (viewing perspective 1, FIG. 8), then the tilt angle of the viewer is automatically set to zero degrees. If the viewing perspective is below eye-level elevation (viewing perspective 2), then the tilt angle is automatically set to a positive tilt angle dependent on how far below the viewing perspective is with respect to the eye-level elevation. Similarly, when the viewing perspective is above eye-level elevation (viewing perspective 3), then the tilt angle is automatically set to a negative tilt angle dependent on how far above the viewing perspective is with respect to the eye-level elevation. The tilt angle continuously adjusts as elevation level changes. In this way, the viewing perspective tilt angle is automatically adjusted to provide the optimal viewing of the representative images in the three-dimensional graphical environment. Providing automatic tilt adjustment reduces the number of degrees of freedom provided to the user to make navigating the environment more manageable. In other words, providing the user with independent tilt adjustment capability can, in some cases, provide too much navigation freedom and can become more confusing and less intuitive to the user.

In one embodiment, user movements are constrained while navigating inside the environment such that each partitioned area can include an active navigation zone and an inactive navigation zone. The active zone is the portion of the partitioned area that the user is allowed to navigate within and the inactive zone is the portion of the partitioned area that the user is not allowed to navigate within. In one embodiment, the active zone is peripherally bounded by the inactive zone except at openings in the partitions of the partitioned area (i.e., locations at which the user passes from the partitioned area into another partitioned area). When the user navigates towards an opening, the inactive/active zones restrict navigation such that the user's movements are naturally directed towards the opening. One advantage of constraining the user movements in this way is that it reduced the user's need to be precisely aligned with openings in order to navigate smoothly out of them.

Additional Information Windows

Figure 9:
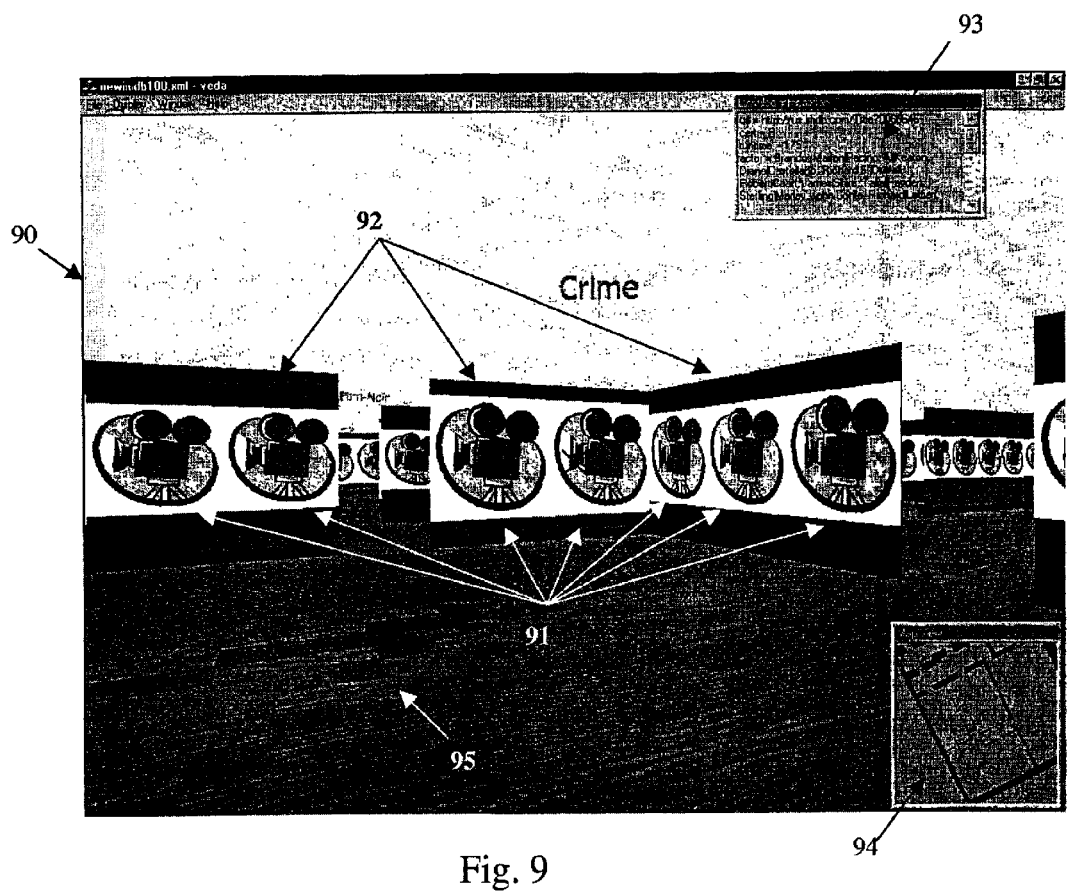
FIG. 9 shows a user's navigation path, overhead map, and additional information window in accordance with the three-dimensional graphical interface and method of viewing a three-dimensional graphical environment of the present invention.

In another embodiment of the user interface and method of using thereof, a detailed information window may be displayed along with the three-dimensional graphical environment to provide the user details about a currently selected image. FIG. 9 shows the three-dimensional graphical interface 90 of the present invention in which the viewing perspective is within a partitioned area having a plurality of images 91 distributed upon a plurality of partitions 92. It should be noted that images 91 represent a plurality of movie posters and in this embodiment the representative images correspond to posters of movies falling under the category of crime movies. A detailed information window 93 is shown in the corner of the interface including text describing at least one of the images (i.e. movie) within the area. For instance, the detailed information may include the director of the movie, the release date of the movie, the actors, etc. Display of the window can be viewer initiated or automatically displayed upon selection of the image within the environment. Alternatively, the window can be automatically displayed without a selection. In addition, the window can be updated as the user simply navigates around the environment.

In another embodiment of the user interface and method of using thereof, an overhead map 94 of the environment shows the navigation path of the user within the environment to keep track of where the user has visited and is currently located. In a similar manner, the navigation path 95 is also shown within the environment itself to provide navigation history. In one embodiment, the navigation path can be associated with a time stamp to provide the user with a means of determining a navigation location dependent on time of day or a specific date thereby providing a much more comprehensive and complete navigation history. Moreover, other user options can include but are not limited to the user selecting and highlighting portions of the navigation path so as to be automatically moved to that location as well as having the option to simply clear the entire path navigation path.

In the preceding description, numerous specific details are set forth in order to provide a thorough understanding of the present invention. It will be apparent, however, to one skilled in the art that these specific details need not be employed to practice the present invention. In other instances, well-known techniques have not been described in detail in order to avoid unnecessarily obscuring the present invention.

In addition, although elements of the present invention have been described in conjunction with certain embodiments, it is appreciated that the invention can be implemented in a variety of other ways. Consequently, it is to be understood that the particular embodiments shown and described by way of illustration is in no way intended to be considered limiting. Reference to the details of these embodiments is not intended to limit the scope of the claims which themselves recited only those features regarded as essential to the invention.

I claim:

1. A method for navigating through a three-dimensional graphical environment comprising:

providing at least two modes for viewing the environment having a boundary defining an inside area and an outside area of the environment including:

a first mode for viewing and navigating within the inside area thereby providing an "eye level" view of the environment; and a second mode for viewing and navigating within the outside area providing an overhead view of the environment;

wherein switching between modes occurs automatically dependent on user movement; and wherein when switching between modes a continuous viewing perspective is provided.

2. The method as described in claim 1 wherein the inside area is partitioned, the method further comprising navigating by passing over the partitions by transitioning between the first mode and the second mode.

3. The method as described in claim 2 further comprising providing one of transparent and translucent partitions.

4. The method as described in claim 1 wherein the inside area is partitioned, the method further comprising navigating by passing through the partitions while in the first mode.

5. The method as described in claim 3 wherein the inside area is partitioned, the method further comprising navigating by passing through the partitions while in the first mode without passing through a doorway.

* * * * *